(12) United States Patent
Tanaka

(10) Patent No.: US 7,853,866 B2
(45) Date of Patent: Dec. 14, 2010

(54) APPARATUS, METHOD AND SYSTEM FOR DOCUMENT CONVERSION, APPARATUSES FOR DOCUMENT PROCESSING AND INFORMATION PROCESSING, AND STORAGE MEDIA THAT STORE PROGRAMS FOR REALIZING THE APPARATUSES

(75) Inventor: Tetsuomi Tanaka, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1191 days.

(21) Appl. No.: 11/452,176

(22) Filed: Jun. 13, 2006

(65) Prior Publication Data

US 2006/0282760 A1 Dec. 14, 2006

(30) Foreign Application Priority Data

Jun. 14, 2005 (JP) ............................ 2005-174112

(51) Int. Cl.
G06F 17/00 (2006.01)
G06F 17/21 (2006.01)

(52) U.S. Cl. .................... 715/205; 715/200; 715/234; 715/239; 715/241; 715/247; 715/255; 715/277

(58) Field of Classification Search ................. 715/200, 715/234, 239, 241, 247
See application file for complete search history.

(56) References Cited

U.S. PATENT DOCUMENTS

| | | | | |
|---|---|---|---|---|
| 5,926,824 A | * | 7/1999 | Hashimoto | 715/210 |
| 5,963,966 A | * | 10/1999 | Mitchell et al. | 715/236 |
| 6,415,307 B2 | * | 7/2002 | Jones et al. | 715/202 |
| 6,456,747 B2 | * | 9/2002 | Altman | 707/10 |
| 7,529,408 B2 | * | 5/2009 | Vohariwatt et al. | 715/234 |
| 2001/0036324 A1 | * | 11/2001 | Altman | 382/305 |
| 2001/0047373 A1 | * | 11/2001 | Jones et al. | 707/515 |
| 2003/0190142 A1 | * | 10/2003 | Togashi et al. | 386/52 |
| 2003/0208502 A1 | * | 11/2003 | Lin | 707/101 |
| 2004/0247206 A1 | * | 12/2004 | Kaneda et al. | 382/305 |
| 2005/0278624 A1 | * | 12/2005 | Nishikawa et al. | 715/517 |

(Continued)

FOREIGN PATENT DOCUMENTS

JP    8-137909 A    5/1996

OTHER PUBLICATIONS

J.D. Biersdorfer, "Scanners turns text into files", Dec. 1, 2003, Oakland Tribune, pp. 1-2.*

(Continued)

Primary Examiner—Chau Nguyen
(74) Attorney, Agent, or Firm—Rossi, Kimms & McDowell LLP

(57) ABSTRACT

An apparatus for document conversion that are capable of facilitating conversion of document image data to an electronic document having table of contents data even with a limited storage resource. The document image analysis section 302 extracts character regions from a document image 301. The contents/index/footer conversion section 307 generates table of contents data based on the extracted character regions and page numbers of the character regions. An electronic document having a table of contents is generated based on the document image 301 and the generated table of contents data. Link information is added to respective ones of items in the generated table of contents data for linking the items in the generated table of contents data with corresponding positions in the electronic document in which the items are described.

11 Claims, 15 Drawing Sheets

U.S. PATENT DOCUMENTS

2006/0069670 A1* 3/2006 Khaliq et al. .................. 707/3
2006/0074868 A1* 4/2006 Khaliq et al. .................. 707/3
2006/0075327 A1* 4/2006 Sriver ...................... 715/501.1
2006/0080309 A1* 4/2006 Yacoub et al. ................. 707/4

OTHER PUBLICATIONS

Thomas J. Fitzgerald, "News Watch: Software; PDF Text Flows Into Word, With Graphics Along for the Ride", Oct. 30, 2003, The New York Times, p. 1.*

* cited by examiner

FIG. 9

STRUCTURE OF ELECTRONIC DOCUMENT

| HEADER | FIRST PAGE DATA | SECOND PAGE DATA | ... | LAST PAGE DATA | TABLE OF CONTENTS DATA | INDEX DATA | FOOTER |

FIG. 14

TABLE OF CONTENTS

OPERATION MANUAL··· P1

1. MACHINE OVERVIEW ··· P2

1-1 STRUCTURE OF ··· P2
      THE MACHINE

2. EXPLANATION OF ··· P3
   SECTIONS

·
       ·
       ·

10. MAINTENANCE ··· P10

FIG. 15

```
                    INDEX

COLUMN A
          OOOO      ···  P1
          OOOO      ···  P2, P4
      COLUMN KA
          OOOO      ···  P3, P5, P7
          OOOO      ···  P9
             ⋮              ⋮
```

APPARATUS, METHOD AND SYSTEM FOR DOCUMENT CONVERSION, APPARATUSES FOR DOCUMENT PROCESSING AND INFORMATION PROCESSING, AND STORAGE MEDIA THAT STORE PROGRAMS FOR REALIZING THE APPARATUSES

BACKGROUND OF THE INVENTION

1. Field of the Invention

The present invention relates to an apparatus, a method, and a system for document conversion for converting document image data to an electronic document, a document processing apparatus, an information processing apparatus, and storage media that store programs for realizing the apparatuses.

2. Description of the Related Art

In recent years, a number of digital technology-based functions have become incorporated into image forming apparatuses such as copiers. Some of them can serve as document conversion apparatuses having the ability to convert a scanned image to an electronic file and transmit the electronic file to another apparatus via a network. As those files which are subjected to conversion to electronic file, there can be mentioned simple image files such as TIFF format files, and document files of electronic document formats for word processors in which images are laid out on each entire page.

However, such a conventional document conversion apparatus needs to hold image data for all pages in a storage resource until the document conversion to a desired electronic document format is finished. When this kind of document conversion apparatus is incorporated into a machine that has a limited storage resource, a problem is posed that the need of increasing the capacity of storage resource results in increased costs, or the number of pages of an electronic document needs to be limited within the capacity of the storage resource of the machine.

Meanwhile, the next phase of document conversion apparatuses under consideration includes automatic generation of a table of contents or index from a plurality of pieces of image data for document pages, and conversion of the thus generated contents or index to an electronic document.

As an example of apparatuses that generate a table of contents, an image forming apparatus is known that performs character recognition on images of originals read in by a scanner, extracts headlines and page numbers of the originals from the recognized characters, and sorts the extracted headlines according to page number to thereby generate and print out an image of a table of contents (see Japanese Laid-Open Patent Publication (Kokai) No. H08-137909.) However, this kind of image forming apparatus, which generates an image of a table of contents and simply prints out the same, is not suitable for use as an electronic document generating apparatus.

An object of the present invention is to provide an apparatus, a method, and a system for document conversion, a document processing apparatus, and an information processing apparatus that are capable of facilitating conversion of document image data to an electronic document having table of contents data even with a limited storage resource, and provide storage media for storing programs for realizing the apparatuses.

Another object of the present invention is to provide an apparatus, a method, and a system for document conversion, a document processing apparatus, and an information processing apparatus that can improve the usability of an electronic document that has a table of contents, and provide storage media for storing programs for realizing the apparatuses.

SUMMARY OF THE INVENTION

To attain the above objects, in a first aspect of the present invention, there is provided a document conversion apparatus for converting document image data to an electronic document, the document conversion apparatus comprising a character region extraction device that extracts character regions from the document image data, a table of contents data generation device that generates table of contents data based on the extracted character regions and page numbers of the character regions, and an electronic document generation device that generates an electronic document having a table of contents based on the document image data and the generated table of contents data, and wherein the table of contents data generation device comprises a table of contents link information adding device that adds link information to respective ones of items in the generated table of contents data for linking the items in the generated table of contents data with corresponding portions in the electronic document in which the items are described.

According to the document conversion apparatus, link information is added to items in the generated table of contents data for linking the items in the generated table of contents data with corresponding positions in the electronic document in which the items are described, so that the usability of an electronic document with a table of contents can be improved.

Preferably, the document conversion apparatus further comprises a title portion determination device that determines a title portion from the extracted character regions, and wherein the table of contents data generation device generates the table of contents data based on a character region for the title portion and a page number of the character region.

Preferably, the document conversion apparatus further comprises a character recognition device that performs character recognition on the extracted character regions, and wherein the table of contents data generation device generates the table of contents data based on the character regions, a result of the character recognition on the character regions, and the page numbers of the character regions.

Preferably, the document conversion apparatus further comprises a data conversion device that converts the document image data to an electronic document corresponding to a predetermined document format, wherein the electronic document generation device generates the electronic document having a table of contents based on the electronic document of the predetermined document format that is converted by the data conversion device and the table of contents data that is generated by the table of contents data generation device.

Preferably, the document conversion apparatus comprises a character recognition device that performs character recognition on the extracted character regions, a keyword extraction device that extracts keywords from a result of the character recognition, and an index data generation device that generates index data based on the extracted keywords and page numbers thereof, wherein the index data generation device comprises an index link information adding device that adds link information to respective ones of items in the index data for linking the items in the generated index data with corresponding portions in the electronic document in which these items are described, and the electronic document generation device generates an electronic document having a table of contents and an index based on the document image data, the table of contents data, and the index data.

According to the document conversion apparatus, it is possible to improve the usability of an electronic document that has a table of contents and an index.

Preferably, when any of the items in the table of contents data is specified by a user, a corresponding portion in the generated electronic document in which the specified item is described is displayed.

According to the document conversion apparatus, display can be changed to corresponding position in the electronic document using a table of contents or an index.

Preferably, the document conversion apparatus comprises a character recognition device that performs character recognition on the extracted character regions, and a reliability determination device that determines a reliability of a result of the character recognition, and wherein the table of contents data generation device generates table of contents data in which partial character image data for the title portion is made displayable and character codes resulting from the character recognition on the title portion are made undisplayable when the reliability is below a threshold value, and generates table of contents data in which fonts corresponding to the character codes are made displayable when the reliability is above the threshold value.

According to the document conversion apparatus, it is possible to generate table of contents data that can be switched to display of a title portion in accordance with the reliability of character recognition result.

Preferably, the generated electronic document has a data structure that presents a table of contents, document pages, and an index in this order when the electronic document is opened by an application.

To attain the above objects, in a second aspect of the present invention, there is provided a document conversion method of converting document image data to an electronic document, the document conversion method comprising a character region extraction step of extracting character regions from the document image data, a table of contents data generation step of generating table of contents data based on the extracted character regions and page numbers of the character regions, and an electronic document generation step of generating an electronic document having a table of contents based on the document image data and the generated table of contents data, wherein the table of contents data generation step comprises a table of contents link information adding step of adding link information to respective ones of items in the generated table of contents data for linking the items in the generated table of contents data with corresponding positions in the electronic document in which the items are described.

To attain the above objects, in a third aspect of the present invention, there is provided a document conversion system in which a document processing apparatus and an information processing apparatus are interconnected via a network, wherein the document processing apparatus comprises a data conversion device that converts document image data to document data corresponding to a predetermined document format, a character region extraction device that extracts character regions from the document image data, a document data transmission device that transmits the converted document data to the information processing apparatus whenever the document image data for a predetermined number of pages is converted by the data conversion device, a table of contents data generation device that generates table of contents data based on the extracted character regions and page numbers of the character regions, and a table of contents data transmission device that transmits the generated table of contents data to the information processing apparatus, and wherein the information processing apparatus comprises a reception device that receives the document data and the table of contents data, and an electronic document generation device that generates an electronic document corresponding to the predetermined document format by combining the received document data with the received table of contents data.

According to the document conversion system, since a document data and/or a table of contents data can be transmitted sequentially on a page-by-page basis, conversion of a plurality of document image data to an electronic document having the table of contents data within limited storage resource can be facilitated even if the machine (document processing apparatus) has limited storage resource. According to the document conversion system, conversion to an electronic document having a table of contents data and an index data can be facilitated.

Preferably, the document processing apparatus comprises a character recognition device that performs character recognition on the extracted character regions, a keyword extraction device that extracts keywords from a result of the character recognition, an index data generation device that generates index data based on the extracted keywords and page numbers thereof, and an index data transmission device that transmits the generated index data to the information processing apparatus, wherein the reception device receives the document image data, the table of contents data, and the index data, and the electronic document generation device generates the electronic document by combining the received document image data with the received table of contents data and the received index data.

To attain the above objects, in a fourth aspect of the present invention, there is provided a document processing apparatus that is connected to an information processing apparatus via a network, comprising a data conversion device that converts document image data to document data corresponding to a predetermined document format, a character region extraction device that extracts character regions from the document image data, a document data transmission device that transmits the converted document data to the information processing apparatus whenever the document image data for a predetermined number of pages is converted by the data conversion device, a table of contents data generation device that generates table of contents data based on the extracted character regions and page numbers of the character regions, and a table of contents data transmission device that transmits the generated table of contents data to the information processing apparatus.

Preferably, the table of contents data generation device comprises a table of contents link information adding device that adds link information to respective ones of items in the generated table of contents data for linking the items in the table of contents data with corresponding portions in the electronic document in which the items are described.

To attain the above objects, in a fifth aspect of the present invention, there is provided an information processing apparatus that is connected via a network to a document processing apparatus, the document processing apparatus having a data conversion device that converts document image data to document data corresponding to a predetermined document format, and table of contents data generation device that generates table of contents data, comprising a reception device that receives the document data subjected to conversion in the document processing apparatus and the table of contents data generated in the document processing apparatus, and an electronic document generation device that generates an electronic document corresponding to the predetermined document format by combining the received document data with the received table of contents data.

To attain the above objects, in a sixth aspect of the present invention, there is provided a document conversion method for a document conversion system in which a document processing apparatus and an information processing apparatus are interconnected via a network comprising a data conversion step of converting document image data to document data corresponding to a predetermined document format, a character region extraction step of extracting character regions from the document image data in the document processing apparatus, a document data transmission step of transmitting the converted document data to the information processing apparatus whenever the document image data for a predetermined number of pages is converted at the data conversion step, a table of contents data generation step of generating table of contents data based on the extracted character regions and page numbers of the character regions, a table of contents data transmission step of transmitting the generated table of contents data to the information processing apparatus, a reception step of receiving the document data and the table of contents data in the information processing apparatus, and an electronic document generation step of generating an electronic document corresponding to the predetermined document format by combining the received document data with the received table of contents data.

To attain the above objects, in a seventh aspect of the present invention, there is provided a computer-readable storage medium that stores a program for realizing the document conversion apparatus.

To attain the above objects, in an eighth aspect of the present invention, there is provided a computer-readable storage medium that stores a program for realizing the document processing apparatus.

To attain the above objects, in a ninth aspect of the present invention, there is provided a computer-readable storage medium that stores a program for realizing the information processing apparatus.

The above and other objects, features, and advantages of the invention will become more apparent from the following detailed description taken in conjunction with the accompanying drawings.

BRIEF DESCRIPTION OF THE DRAWINGS

FIG. 9 is a view showing the structure of an electronic document;

FIG. 14 is a view showing a table of contents page; and

FIG. 15 is a view showing an index page.

DETAILED DESCRIPTION OF THE PREFERRED EMBODIMENT

The present invention will be described in detail with reference to drawings showing a preferred embodiment thereof. In a document conversion system of the present embodiment, multi-function peripherals (MFPs) and information processing apparatuses (client PCs) are connected to one another via a network.

Figure 1:
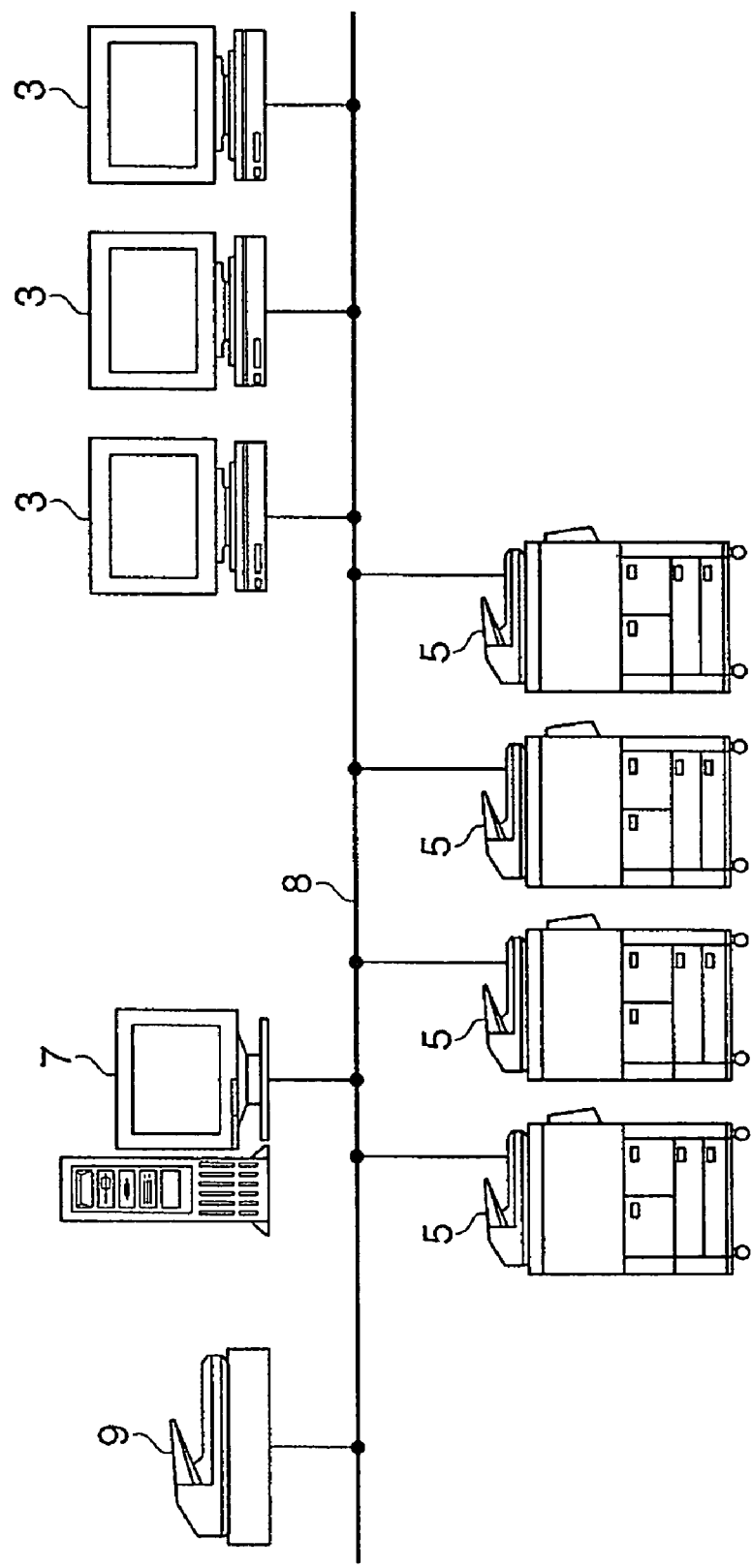
FIG. 1 is a view showing the configuration of a document conversion system according to an embodiment of the present invention.

FIG. 1 is a view showing the configuration of the document conversion system according to the present embodiment. The document conversion system has a configuration in which a document server 7, a plurality of client PCs 3, a scanner 9, and a plurality of MFPs 5 are interconnected via a network 8. The document server 7 manages document image data and the like. The client PCs 3 instruct execution of a job for converting document image data to an electronic document of a predetermined document format, and carry out a process for displaying a converted electronic document. The scanner 9 outputs document image data, obtained by scanning originals, to the document management server 7. The MFPs 5 have a scanner function, a printer function, and a facsimile function, and can convert document image data to an electronic document of a predetermined document format. Document image data to be converted by the MFPs 5 may be obtained by the scanning function of the MFPs 5 or may be input from the document server 7 to the MFPs 5. Electronic documents to be converted to a predetermined document format include general word processor documents as well as PDF documents, documents in HTML/XML language, and so on.

Figure 2:
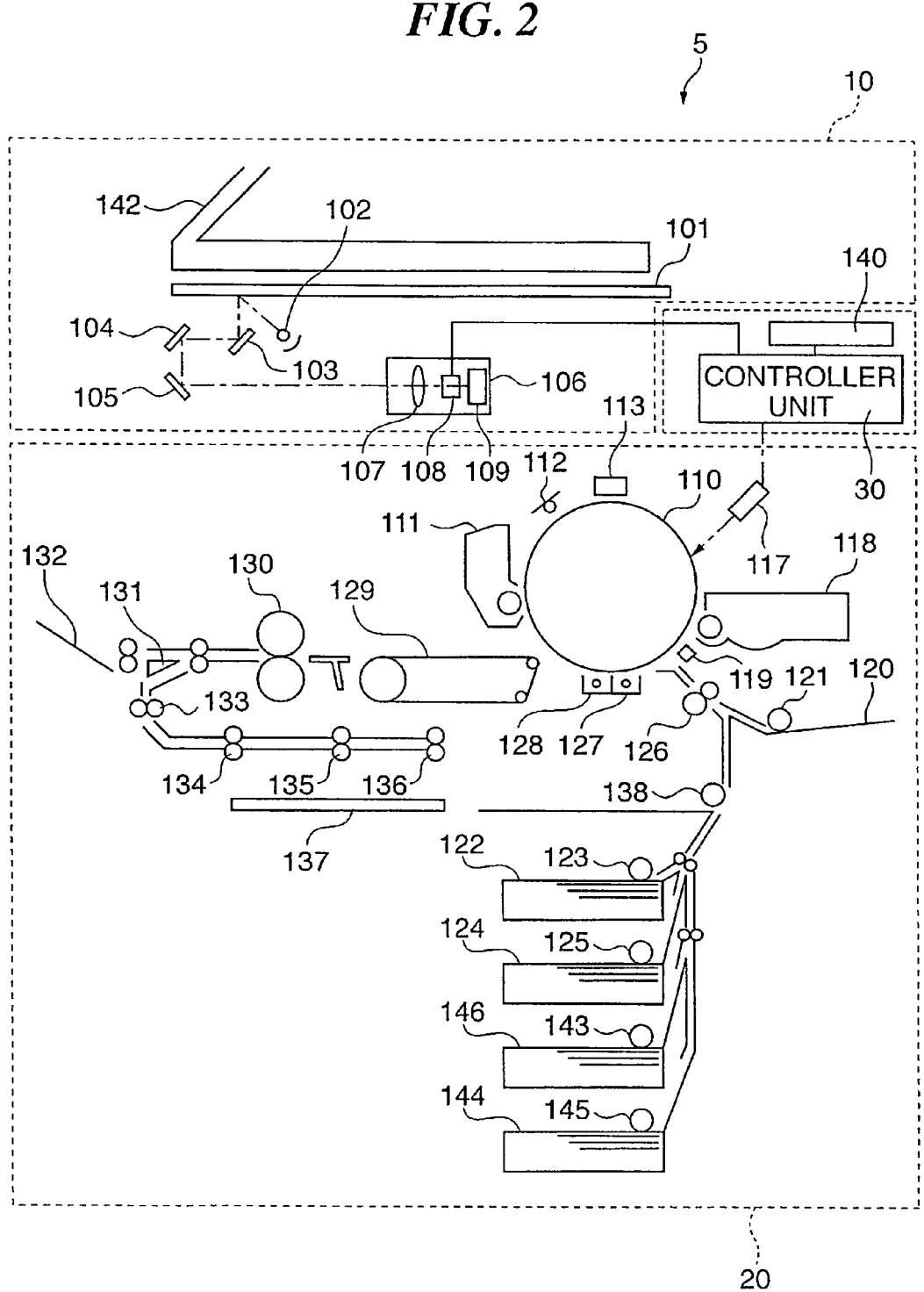
FIG. 2 is a view showing the internal arrangement of an MFP appearing in FIG. 1.

FIG. 2 is a view showing the internal arrangement of the MFP 5 appearing in FIG. 1. The MFP 5 mainly consists of a scanner section 10 and a printer section 20. In the scanner section 10, originals fed from an automatic original feeder (a document feeder) 142 are sequentially placed onto a predetermined position on an original platen glass 101. An original illuminating lamp 102 is a halogen lamp, for example, that exposes an original placed on the document platen glass 101. Scanning mirrors 103, 104, and 105 are housed in an optical scanning unit (not shown) and reciprocate to guide reflected light from the original to a CCD unit 106. The CCD unit 106 may consist of a focusing lens 107 for focusing reflected light from the original onto an image pickup element 108 that consists of CCD; and a CCD driver 109 for driving the image pickup element 108. Image signals output by the image pickup element 108 are converted to 8-bit digital data, for example, and are input to a controller unit 30.

In the printer section 20, electric charge is removed from a photosensitive drum 110 by a pre-exposing lamp 112 in preparation for image formation. A primary electrostatic charger 113 uniformly electrifies the photosensitive drum 110. A semiconductor laser 117 as an exposure unit irradiates the photosensitive drum 110 based on image data processed by the controller unit 30 to form a static latent image thereon. A developing device 118 contains a black developer (i.e., toner). A pretransfer electrostatic charger 119 applies a high voltage to the photosensitive drum 110 before a toner image developed on the photosensitive drum 110 is transferred onto a sheet. Sheet feed rollers 121, 123, 125, 143 and 145 associated with a manual feed unit 120 and sheet feed units 122, 124, 146 and 144 are driven to feed sheets from the respective associated feed units into the MFP. A sheet fed from each sheet feed unit is temporarily stopped at a location of a registration roller 126, and is then further fed into the MFP with rotation of photosensitive drum 110 in such a manner that sheet feed timing coincides with writing timing in which a toner image developed on the photosensitive drum 110 is transferred to the sheet. A transfer electrostatic charger 127 transfers the toner image formed on the photosensitive drum 110 to the transfer sheet fed thereto. A separating electrostatic charger 128 separates the transfer sheet on which the transfer operation has been completed, from the photosensitive drum 110. The toner remaining on the photosensitive drum 110 without being transferred to the sheet is collected by a cleaner 111.

A conveyer belt 129 conveys the transfer sheet for which the transfer process has been completed to a fixing unit 130 where the toner image is fixed to the transfer sheet, e.g., by heat. A flapper 131 controls the conveying direction of the transfer sheet, for which the transfer process has been completed, between a direction toward a sorter 132 and a direction toward an intermediate tray 137. Feed rollers 133 to 136 feed the transfer sheet, for which the fixing process has once been completed, after inverting the same (for multiple printing) or without inverting the same (for double-sided printing). A re-feeding roller 138 again feeds the transfer sheet placed on the intermediate tray 137 up to the location where the registration roller 126 is disposed. As discussed later, the controller unit 30 has a micro-computer, image processing section, and the like and controls the above-described image formation in accordance with instructions from an operation section 140.

Figure 3:
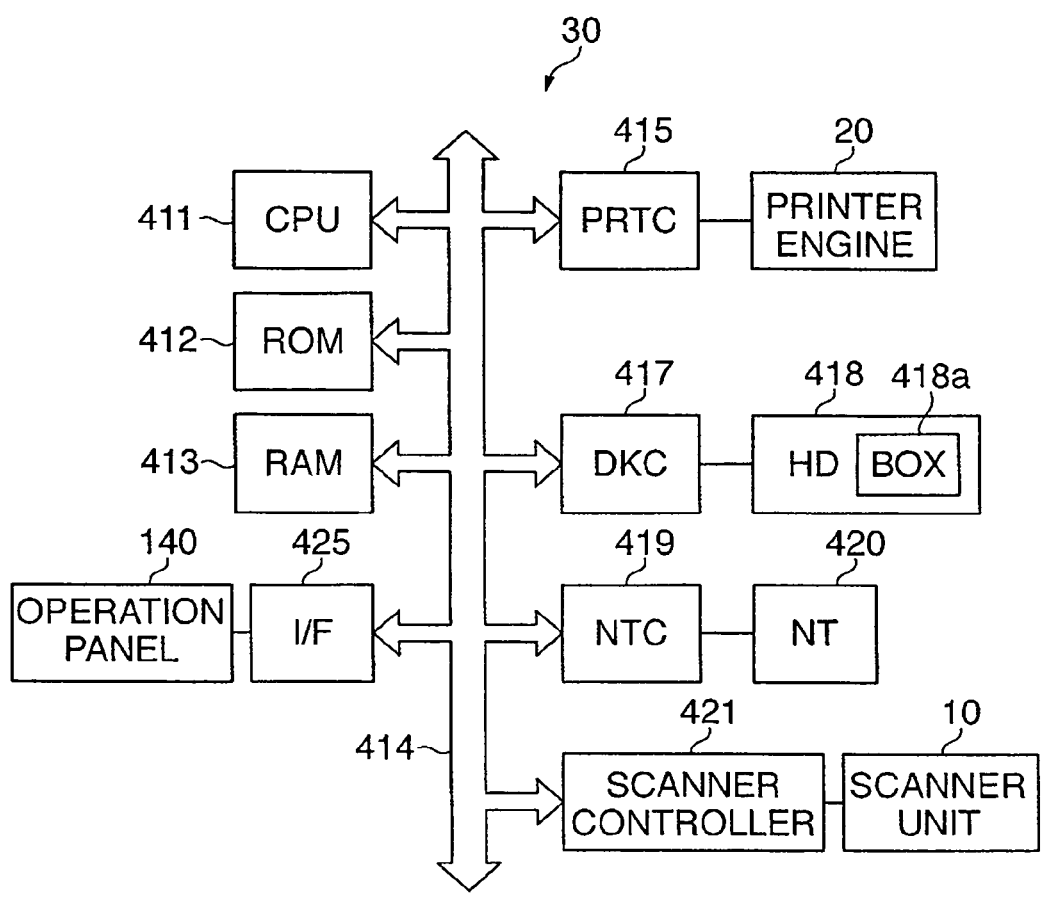
FIG. 3 is a block diagram showing the hardware configuration of a controller unit appearing in FIG. 2.

FIG. 3 is a block diagram showing the hardware configuration of the controller unit 30 appearing in FIG. 2. The controller unit 30 has a configuration in which well-known components such as a CPU 411, a ROM 412, a RAM 413, a printer controller (PRTC) 415, a disk controller (DKC) 417, a network controller (NTC) 419, a scanner controller 421, and an operation interface (I/F) 425 are interconnected via a system bus 414. To the printer controller (PRTC) 415, the printer section (a printer engine) 20 is connected. A hard disk device (HD) 418 is connected to the disk controller (DKC) 417. The hard disk device (hereinafter referred to simply as "a hard disk") 418 has a box 418a allocated thereto as a storage area for storing document image data and the like. A network device (NT) 420 for controlling connection between the MFPs 5 and the network 8 is connected to the network controller (NTC) 419. The scanner section (a scanner unit) 10 is connected to the scanner controller 421. To the operation I/F 425, the operation panel 140 is connected.

The CPU 411 is a central processing unit that controls the entire apparatus, and executes various processes required for printing in accordance with various programs stored in the ROM 412, utilizing the RAM 413 as a work area. The system bus 414 serves as a communication path for transfer of data and/or control signals among the above-described sections. The ROM 412 stores therein various programs as well as character pattern data (font data) or the like. The RAM 413 or the HD 418 stores document data, document image data (image data), font data that are downloaded from the document server 7 on demand as well as a document conversion program to be discussed below. The CPU 411 generates character pattern data and/or image data (bitmap data) according to programs stored in the ROM 412 and causes such data to be expanded in a print buffer in the printer controller 415. Also, as described later, the CPU 411 converts document image data into an electronic document of a predetermined document format in accordance with a document conversion program.

The printer controller 415 outputs a printing control signal that is generated based on bitmap data to the printer engine 20. The network controller 419 controls the operation of the network device (NT) 420 when transmitting and receiving data to and from the client computer 3 or the document server 7 over the network 8.

Figure 4:
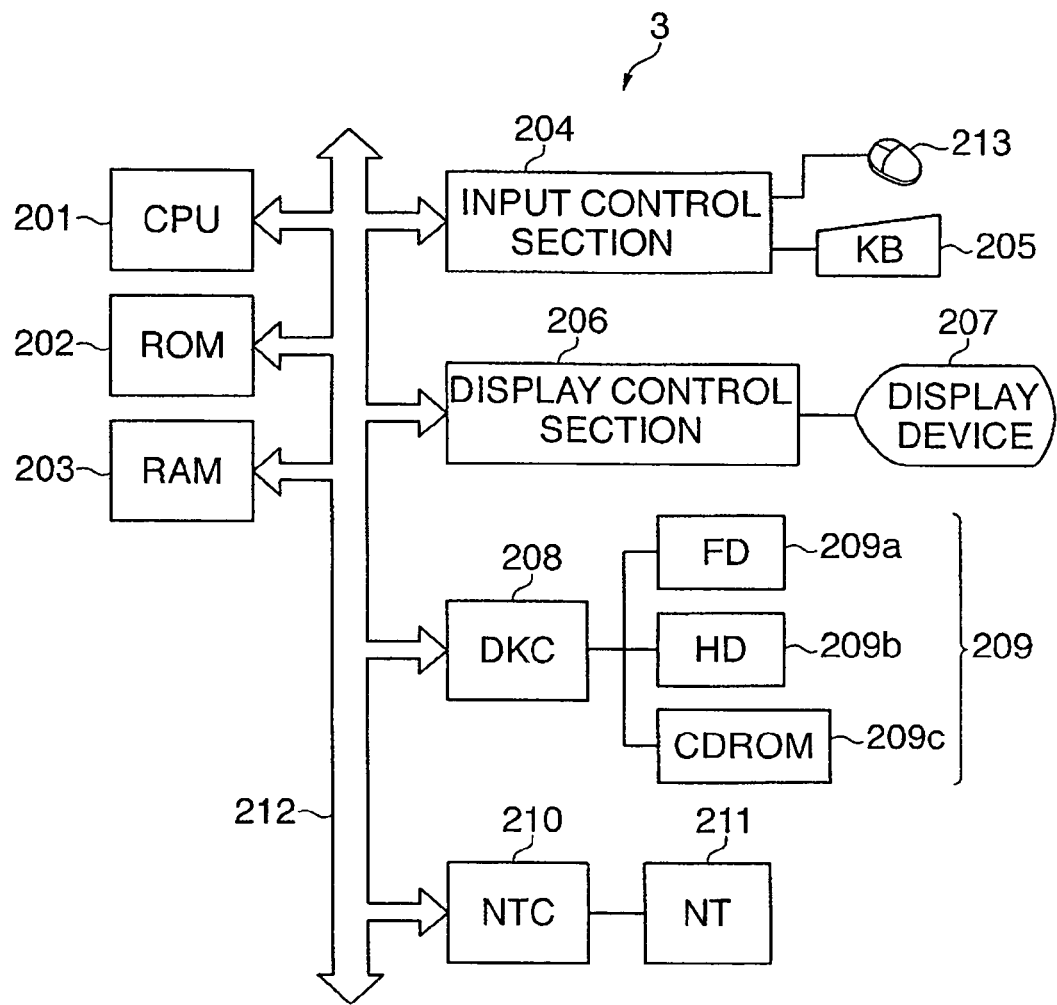
FIG. 4 is a block diagram showing the hardware configuration of a client PC appearing in FIG. 1.

FIG. 4 is a block diagram showing the hardware configuration of the client PC 3 appearing in FIG. 1. As the PCs 3 and the document server 7 all have the same configuration, only one client PC 3 is shown here. A CPU 201 is a central processing unit responsible for control of the entire apparatus and computation. A ROM 202 is a read-only memory that stores therein a system start-up program, a basic I/O program, character pattern data (i.e., font data) for converting a character code to a bit pattern, and the like. A RAM 203 is a random access memory for temporarily storing data for use in computation by the CPU 201, computation results, character pattern data sequences converted from character codes, graphic data, image data for display, and the like.

An input control section 204 receives key input data (i.e., character codes and/or control codes) from a keyboard (KB) 205 and/or instruction information from a mouse 213, and transmits it to the CPU 201. A display control section 206 reads out a character pattern data sequence stored in the RAM 203 and transfers it to a display device 207. The display device 207 receives the character pattern data sequence, graphic data, and image data from the display control section 206 and displays the same on the screen.

A disk control section (DKC) 208 controls access to an external storage device 209. The external storage device 209 in the present embodiment includes a floppy (a registered trademark) disk device (FD) 209a, a hard disk device (HD) 209b, and a CD-ROM drive 209c. The HD 209b stores therein character pattern data (font data), a character rasterizing processing program for reading out font data and converting the same to bitmap data, a graphic rasterizing processing program for processing graphic data, an image data processing program for processing image data, applications such as a word processor capable of editing electronic documents converted in the MFP 5, and the like. A network control section (NTC) 210 controls the operation of the network device (NT) 211. The system bus 212 is used for data transfer between the above-described sections.

Figure 5:
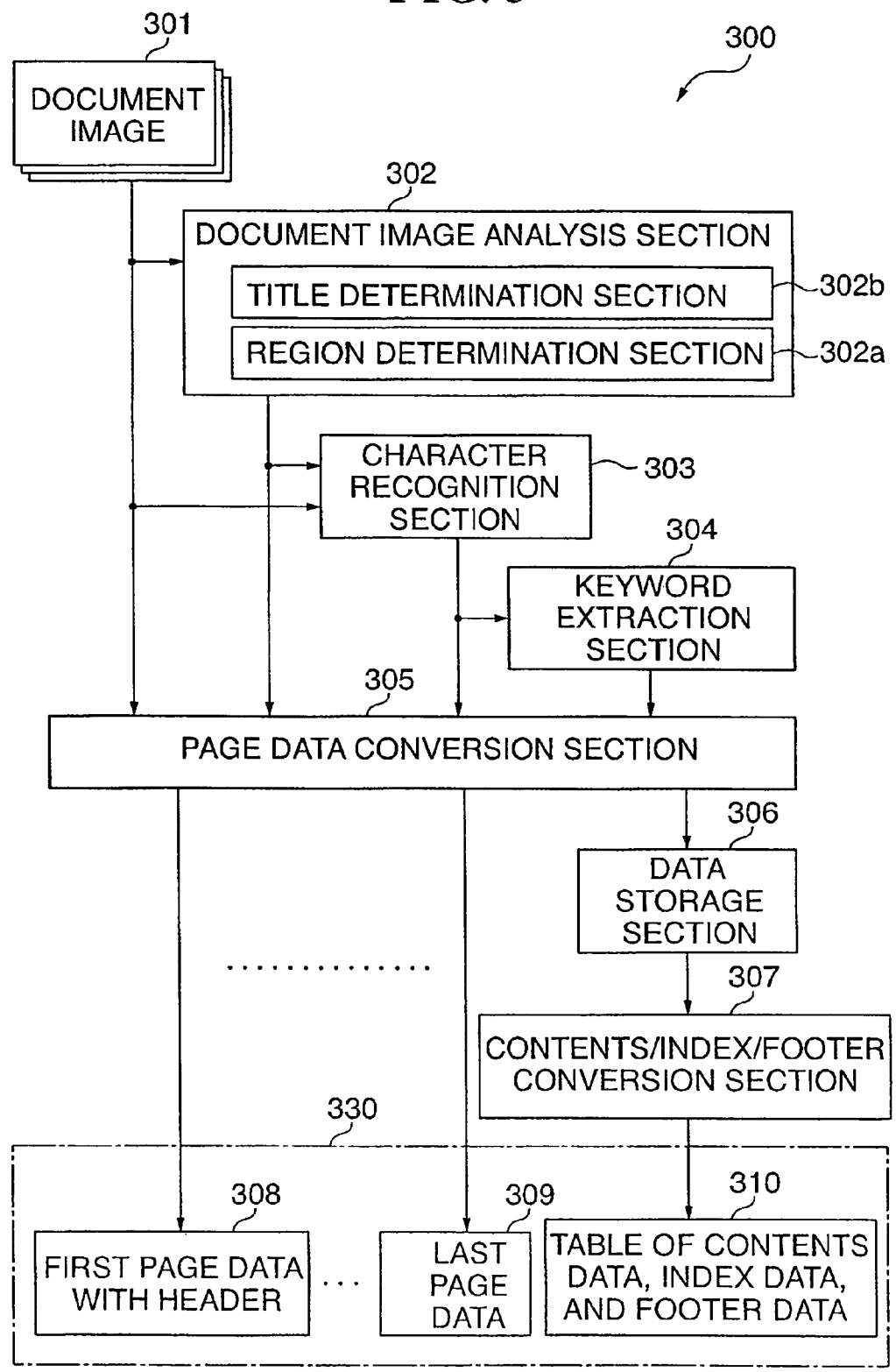
FIG. 5 is a block diagram showing the configuration of document conversion function section in the MFP appearing in FIG. 1.

FIG. 5 is a block diagram showing the structure of document conversion function section of the MFP 5 appearing in FIG. 1. The document conversion function section 300 includes a document image analysis section 302, a character recognition section 303, a keyword extraction section 304, a page data conversion section 305, a data storage section 306, and a contents/index/footer conversion section (hereinafter sometimes referred to as "the footer conversion section") 307. The document image analysis section 302 has a region determination section 302a and a title determination section 302b. When document image data (hereinafter referred to simply as "the document image") 301 is input, the document image analysis section 302 determines a title portion (i.e., headline) in the inputted document image through extraction of a character region and layout analysis. The character recognition section 303 performs a character recognition process on one or more character regions extracted by the document image analysis section 302. The keyword extraction section 304 extracts keywords from character regions in accordance with a recognition result obtained by the character recognition section 303.

Upon receipt of the document image 301 and processing results obtained by the document image analysis section 302, the character recognition section 303, and keyword extraction section 304, the page data conversion section 305 performs a conversion process of the document image 301 to an electronic document of a desired electronic document format on a page-by-page basis. Result of conversion to an electronic document is output for each page. In FIG. 5, resultant first page data and last page data are denoted by reference numerals 308 and 309, with illustrations of other page data omitted. Data necessary to create a table of contents and index is output to the data storage section 306. The data storage section 306 holds the data output from the page data conversion section 305 until the conversion process for the last page completes.

The contents/index/footer conversion section 307 generates table of contents data and index data from the data stored in the data storage section 306, performs a conversion process to obtain footer data, and outputs these data which are collectively shown by reference numeral 310 in FIG. 5. Among the page data obtained by the conversion to an electronic document format by the page data conversion section 305, only the first page data 308 contains header data. In the present embodiment, the terms "header" and "footer" indicate information for controlling the order in which one or more table of contents pages and one or more index pages are displayed, for example. Except for the header data, there is no structural difference between the first page data and data for the second and subsequent pages. These page data are output according to page number. Finally, the contents/index/footer data 310 is output, which have been obtained by the contents/index/footer conversion section 307. When the header data, page data, table of contents data, index data, and footer data are coupled together in a destination device, a desired electronic document 330 is obtained. The functions of the above-described document conversion function section 300 (FIG. 5) are realized by the CPU 411 executing the document conversion program stored in the hard disk 418, as will be discussed below.

Figure 6:
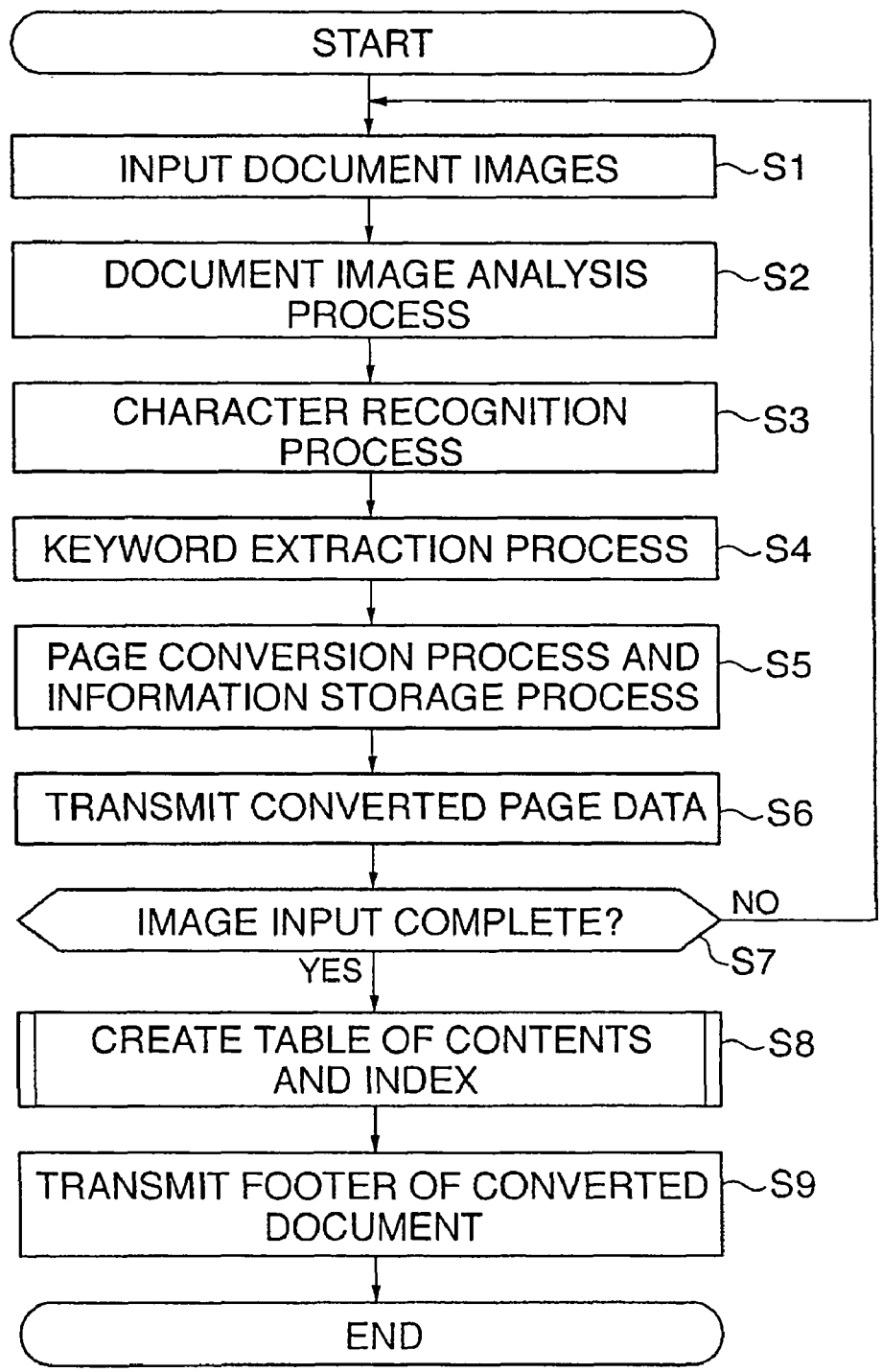
FIG. 6 is a flowchart showing the procedure of process for conversion to an electronic document by the document conversion function section in the MFP appearing in FIG. 1.
Figure 7:
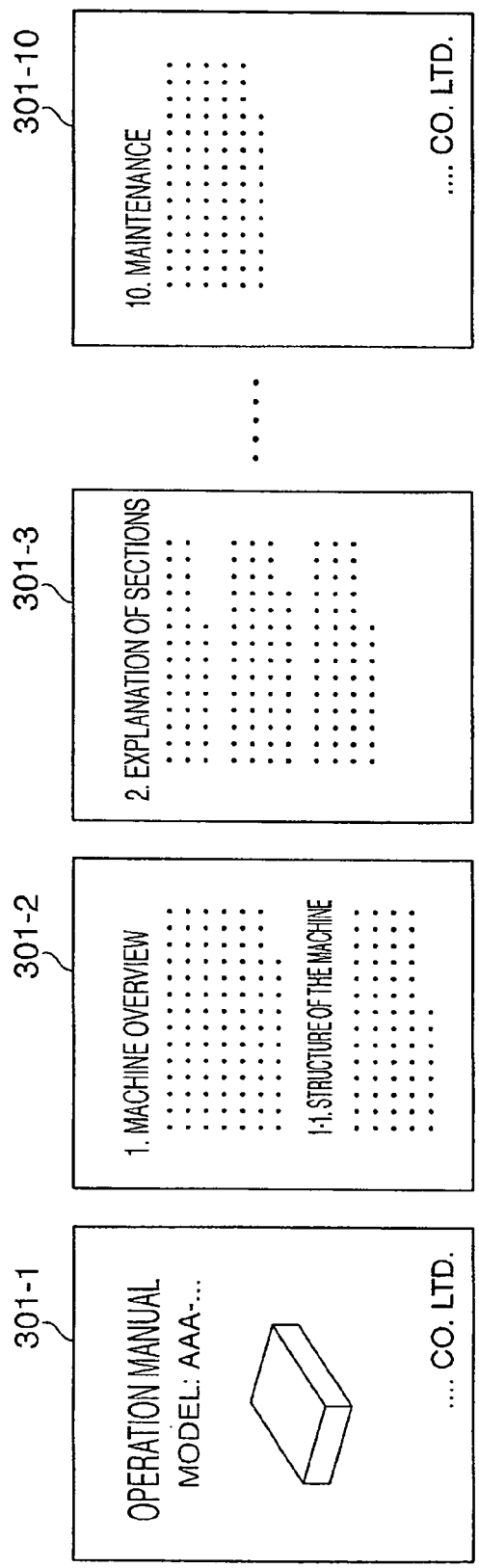
FIG. 7 is a view showing a plurality of document images.

FIG. 6 is a flowchart showing the procedure for a conversion process of a document image to an electronic document by the document conversion function section 300 of the MFP 5. A document conversion program corresponding to the flowchart is stored in the hard disk 418 and executed by the CPU 411. Initially, a process for inputting document images (document image data) is performed (step S1). At this document image input, document images scanned in by the scanner section 10 from an original are input. Although document image input is performed page by page in the present embodiment, it may be performed in units of any number of pages. FIG. 7 is a view showing a plurality of document images of one document. This example shows a case where a plurality of (N=10) document images 301-1, 301-1, 301-3, . . . , 301-10 for an instruction manual are input. Instead of using the scanner section 10 of the MFP 5, document images scanned in by the scanner device 9 connected to the network 8 may be input.

Next, a document image analysis process is carried out, in which character regions are extracted by the region determination section 302a from the input document images, and a title portion is determined by the title determination section 302b based on the layout of the character regions (step S2). Extraction of character regions may be performed with any suitable technique. For example, there can be mentioned a filling technique that expands black pixels in image data horizontally and vertically to place one or more neighboring white pixels with black pixels (to the extent that black pixels making up characters or character lines are connected with each other), to thereby recognize a character region.

Figure 8:
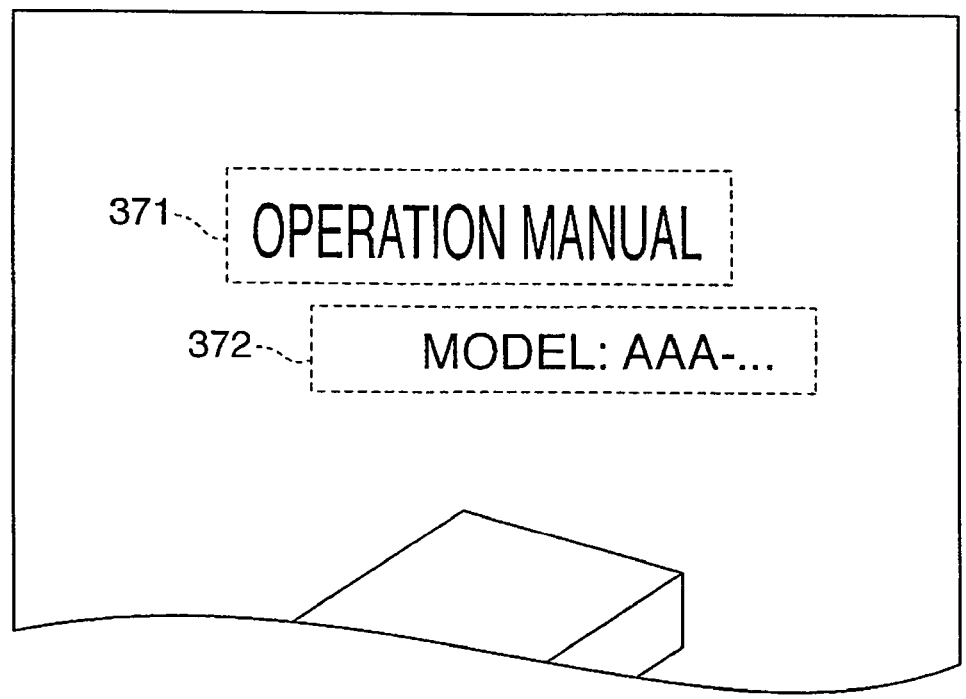
FIG. 8 is a view showing character regions extracted.

FIG. 8 is a fragmentary view showing extracted character regions. A title portion is determined from among the extracted character regions. The determination of a title portion may be made based on information such as the positions of the extracted character regions 371 and 372 within the document image and the size of characters contained in the character regions. Character size can be determined in the following manner, for example. On the basis of binarized image data in a character region, black pixel distribution is determined by counting the number of black pixels in the main scanning direction (i.e., character row direction) at respective pixel positions along the sub-scanning direction (i.e., character column direction). In this black pixel distribution, the count value (frequency) of black pixels varies along the sub-scanning direction. A pixel range from that pixel position in the sub-scanning direction at which the count value changes from "0" to "1" to just before that pixel position at which it changes from "1" to "0" is determined to be character row data, and a character size (height) is determined from the character row data.

Referring to FIG. 6 again, a character recognition process is performed (step S3). In the character recognition process, character recognition on the extracted character region is performed and the result is obtained as text codes and position information. This character recognition process includes an identity matching process that is performed based on the extracted character data and dictionary data, in which characters are recognized from distance values between the character and dictionary data. Further, a keyword extraction process for extracting keywords from the character recognition result is performed (step S4).

Page conversion and information storage processes are performed (step S5). In the page conversion process, data of a desired electronic document is generated page by page. Each page data is converted to a format in which a document image (document image data) is compressed and laid out so that the entire page can be displayed for example when the electronic document is displayed on a client PC 3, and in which hidden text codes are laid out in alignment with corresponding character positions in the document image based on position information obtained from the character recognition result (for example, text codes are embedded in the document image in a transparent color). For instance, the data is converted to individual pages of a PDF document that have text codes embedded therein in a transparent color. The same page conversion process is performed for each page, with header information of an electronic document added to only the top of converted data for the first page.

On the other hand, in the information storage process, the title portion and the keywords obtained at step S4 are stored along with their page numbers, partial images, and position information. Here, partial images for keywords are stored for the purpose of index creation. If there are a plurality of the same keywords, there has to be only one partial image for these keywords and a plurality of images need not be stored. The document image data and character recognition result are erased without being stored after the page conversion process because they are no longer necessary.

Converted data of one page (page data) that has been converted at step S5 is transmitted (step S6). Subsequently, it is determined whether or not the next document image will be input (step S7). When there is the next document image, that is, all of the plurality of document images have not been input yet, the procedure returns to step S1. However, when there is no more document image to be input, that is, when all the plurality of document images have been input, table of contents data and index data are generated, and footer data is obtained through conversion (step S8). As mentioned before, the table of contents data and index data are generated from partial images, character codes, and position information stored at step S5. At this time, the resolution of a character portion image is adjusted (resolution conversion). Then, the footer data including the generated table of contents data and index data is transmitted (step S9).

Figure 10:
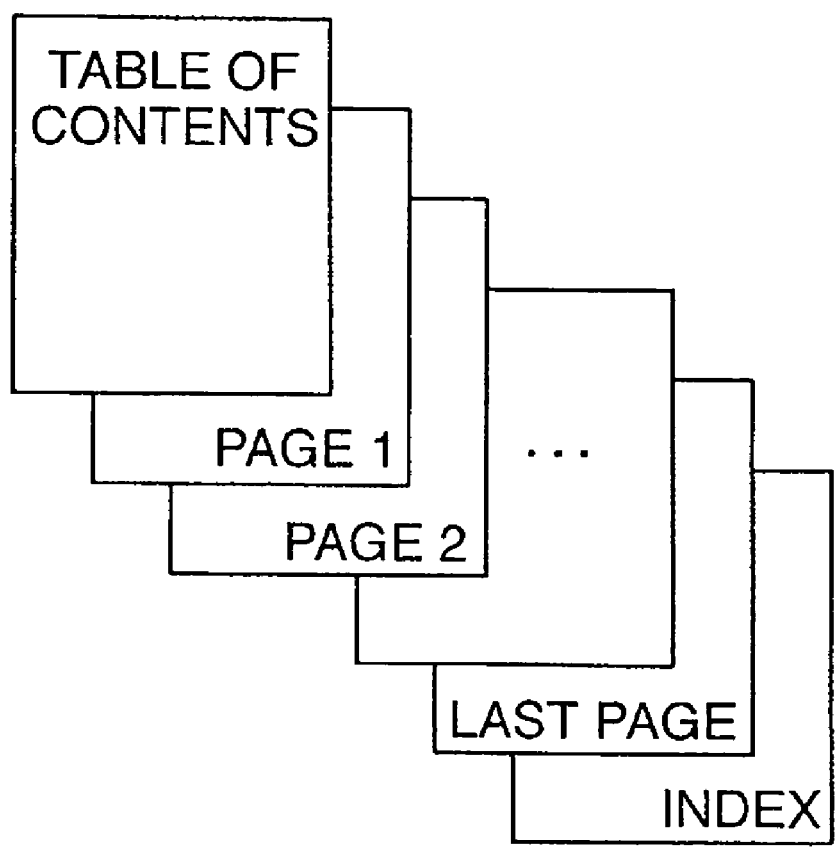
FIG. 10 is a view showing an electronic document opened by an application.

FIG. 9 is a view showing the structure of an electronic document. When the data transmitted at steps S6 and S9 (first page data 308 to contents/index/footer data 310) are coupled together, the resulting electronic document has a structure in which the header, first page data, second page data, . . . , last page data, table of contents data, index data, and footer are arranged in this order. FIG. 10 is a view showing an electronic document opened by an application. In the present embodiment, the header includes information for controlling the order in which one or more table of contents pages are displayed and the footer includes information for controlling the order in which one or more index pages are displayed. As described later, conversion of the header and subsequent data are controlled so that the order will be "the table of contents, page 1, page 2, page 3, . . . , the last page, the index" when the electronic document is opened from an application such as a word processor.

Figure 11:
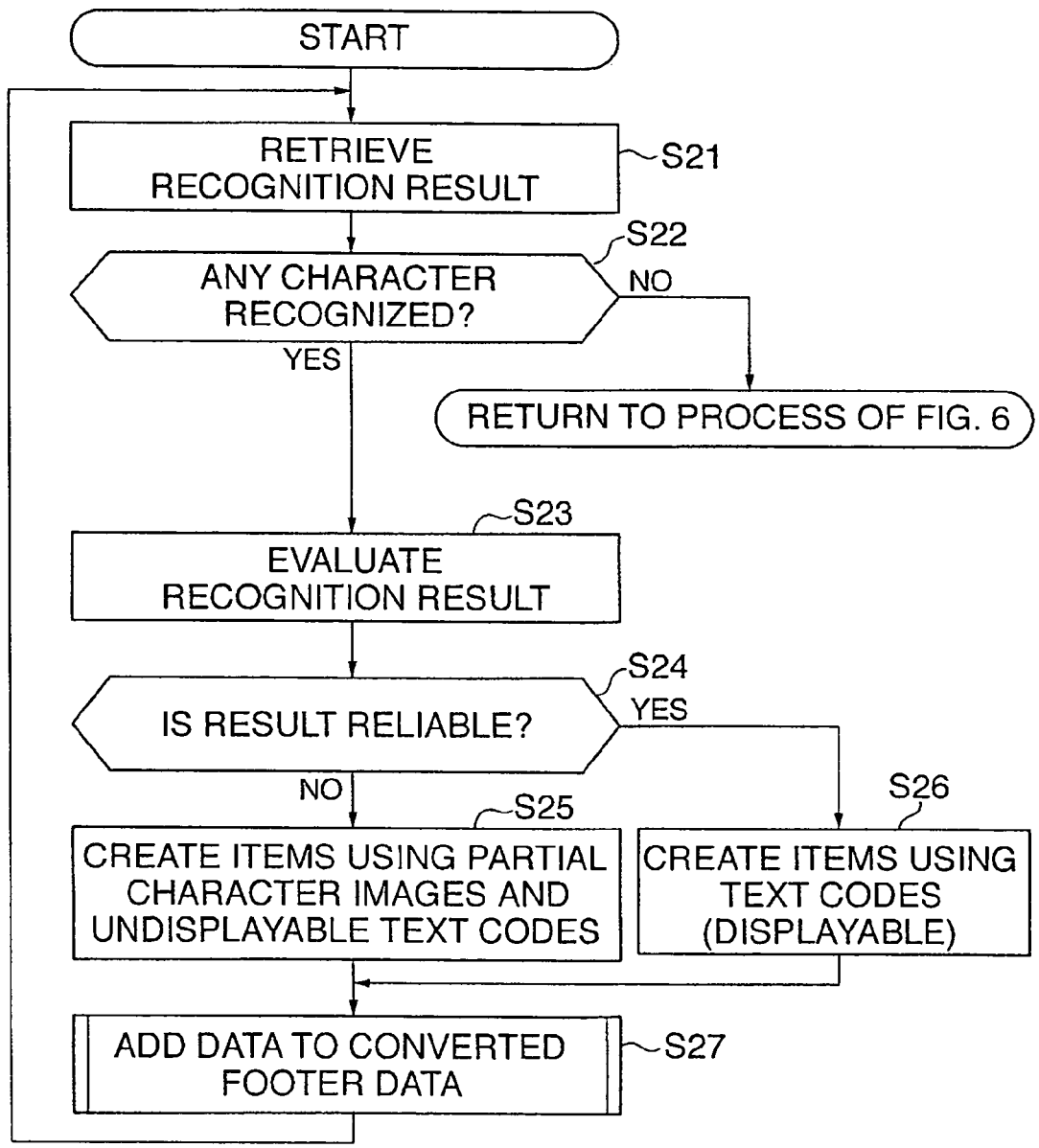
FIG. 11 is a flowchart showing the procedure for generating table of contents data and index data at step S8 appearing in FIG. 6.

FIG. 11 is a flowchart showing the procedure of a process for generating table of contents data and index data at step S8 appearing in FIG. 6. As table of contents data and index data are generated in the same procedure, only the process of generating table of contents data will be shown. Initially, the result of character recognition process at step S3 is retrieved page by page, for instance (step S21). It is determined from the result of the character recognition process whether or not any character has been recognized in the currently processed page (step S22). When no character has been recognized, this process is terminated and the procedure returns to the process shown in FIG. 6. When any character has been recognized, the character recognition result is evaluated to determine its reliability (step S23). The reliability of character recognition result may be determined from information such as character similarity (i.e., distance values relative to dictionary data obtained in identity matching process).

Then, determination is made as to whether or not the character similarity is equal to or higher than a predetermined level and thus the reliability is high (i.e., above a threshold) (step S24). When the reliability is determined to be low (below the threshold), items of the table of contents are created using the partial images of the title portion stored at step S5 and character codes obtained from the character recognition result for the title portion (step S25). At this time, the display size or resolution of the partial images is adjusted in accordance with fonts to be used for text drawing for other items in the table of contents which have been recognized with high reliability. Further, the character codes obtained from the character recognition result are drawn invisibly or undisplayably (i.e., in a transparent color) on the partial images to be displayed, as text codes that correspond to the format of the target electronic document. This enables those items of the table of contents which have been recognized with low reliability to be searched with keywords from an application such as a word processor handling electronic documents. When the invisibly drawn character codes are based on incorrect character recognition result, a correct keyword search will be impossible. However, the original partial image will be displayed and thus such display will serve as a table of contents sufficiently.

On the other hand, when it is determined at step S24 that the reliability of character recognition is high (above the threshold), text is drawn in fonts corresponding to the character codes based on the character recognition result, without using the partial images used at step S25, to thereby create the items of the table of content as in ordinary contents creation (step S26).

A page number added at the creation of table of contents items at steps S25 and S26 has previously been stored in the data storage section 306. In this table of contents creation process, information on link to a corresponding portion (i.e., page) within the electronic document is also added to the page number. In addition to the addition of link information to each of page number items shown in the table of contents, link information to corresponding pages may be added to individual title items in the table of contents. Consequently, when a user clicks on a page number in a displayed table of contents after the electronic document Is opened by an application, a corresponding page of the electronic document will be displayed.

Then, the data generated at steps S25 and S26 are added to footer data currently subjected to conversion process (step S27). The procedure subsequently returns to step S21 and retrieves the next page of the recognition result. When it is determined at step S22 that there is any character in the retrieved result, the above-described process in step S23 and the subsequent steps will be performed in the same way, otherwise, this process is terminated and the procedure returns to the process shown in FIG. 6.

As mentioned above, the above-described procedure is also applicable to generation of index data. After the table of contents data is added to the footer data at step S27, the procedure returns to step S21 to start generation of index data. Index data is generated by retrieving keywords from the character recognition result of the title portion and main body area of the original document and associating the keywords with page numbers. When character recognition reliability is determined to be low at step S24, index items are created by using partial images and character codes at step S25, and when reliability is high, index items are created by using character codes at step S26. Then, at step S27, index items are added to the footer data. These processes are repeated until generation of index data is complete. Also, when index items are created, link information to corresponding portions (i.e., pages) in the electronic document is added to page numbers.

Figure 12:
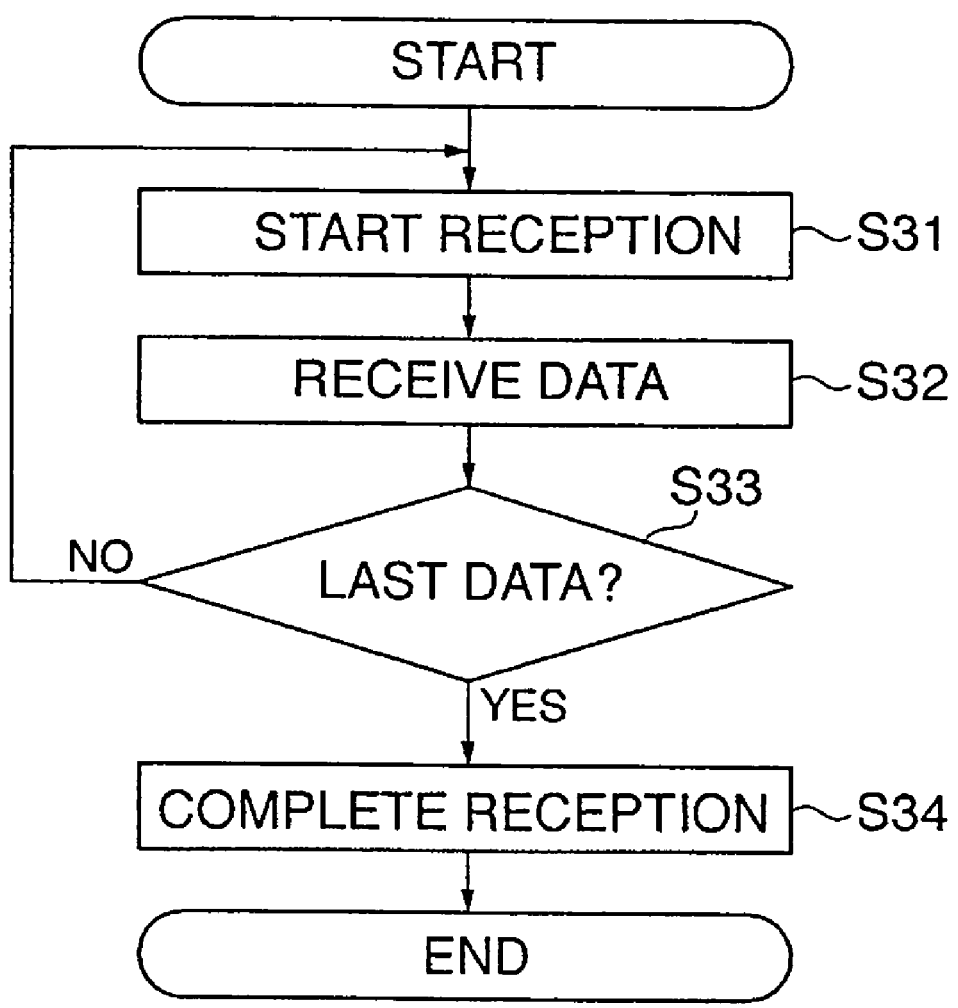
FIG. 12 is a flowchart showing the procedure for receiving electronic document by the client PC appearing in FIG. 1.

FIG. 12 is a flowchart showing the procedure for process of receiving electronic document on the client PC 3 appearing in FIG. 1. The processing program concerned is stored in the external storage device 209 and executed after being loaded into the RAM 203 by the CPU 201.

Upon start of electronic document reception, a document file to be created is initialized (step S31). In this initialization, object files are subjected to generation process, opening process, and coupling process. Then, data generated at steps S6 and S9 are received and added to the end of an opened file (step S32).

Determination is made as to whether the data received has been generated at step S9 (step S33). When the received data is data generated at step S9, a reception completion process is performed in which the opened file is closed and the document file creation is completed (step S34), and this electronic document receiving process is terminated. On the other hand, when the received data is not data generated at step S9 but data generated at step S6, the procedure returns to step S31.

Although conversion process and transmission process of document data are performed on a page-by-page basis in FIG. 6, converted data is not necessarily be transmitted immediately after completion of conversion. Depending on conditions such as processing efficiency on the sender/receiver and the data transfer speed of a communication line, the sender may not transmit converted data immediately. Instead, the sender may spool the converted data to the extent possible and then transmit converted data for a plurality of pages together. In such a case, the process flow of FIG. 6 and that of FIG. 12 would not be synchronized.

Figure 13:
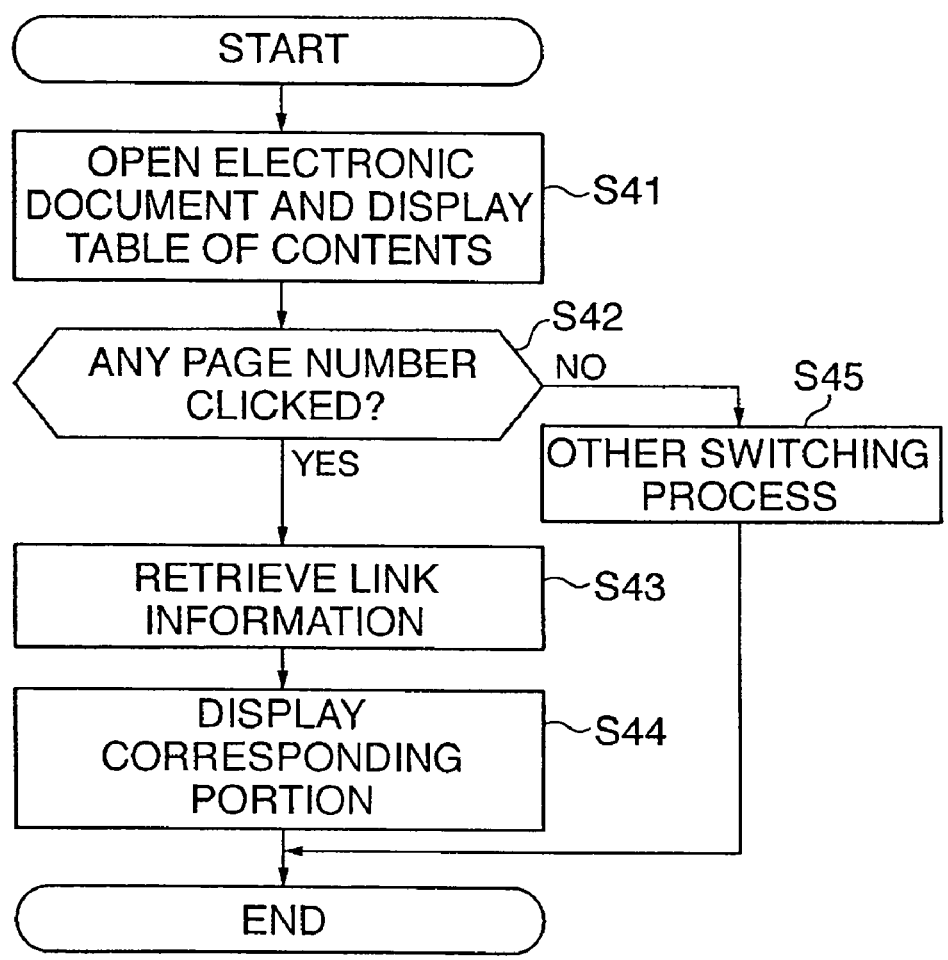
FIG. 13 is a flowchart showing the procedure for switching electronic document display by the client PC appearing in FIG. 1.

FIG. 13 is a flowchart showing the procedure for process of switching electronic document display on client PC 3 appearing in FIG. 1. The display switching processing program is stored in the external storage device 209 as part of an application such as a word processor installed on the client PC 3, and executed after being loaded into the RAM 203 by the CPU 201. First, a received electronic document is opened and a table of contents page is displayed on the display device 207 (step S41). FIG. 14 is a view showing a table of contents page. On the table of contents display screen, headlines (i.e., title portions) are positioned on the left and page numbers are positioned on the right of the screen.

Determination is made as to whether or not any page number (or any item of the table of contents) in the table of contents page has been specified through key input on the keyboard 205 or clicking of the mouse 213 (step S42). When a page number (or an item of the table of contents) has been specified, link information added to the page number (or the item of the table of contents) is retrieved (step S43). The displayed page is changed over to a corresponding portion (page) of the electronic document in accordance with the retrieved link information (step S44). Thereafter, this display switching process is terminated. Meanwhile, when no page number in the table of contents page is specified at step S42 but a page switching key such as "Forward" and "Back" is operated, the displayed page is changed over accordingly (step S45). Thereafter, this process terminates. This applies to an index page as well: a displayed page can be changed to a corresponding portion (i.e., page) by simply specifying a desired page number in an index (or a desired item of the index). FIG. 15 is a view showing an index page. On the index display screen, keywords are arranged in the order of Japanese syllabary on the left and page numbers of corresponding portions of the electronic document are arranged on the right.

Thus, according to the document search system of the present embodiment, converted pages are transmitted from the MFP 5 to the client PC 3 page by page or in units of pages, so that limitation in the capacity of the hard disk 418 (the box 418a, especially) as storage resource of the MFP 5 can be overcome by overwriting new document image data on the transmitted one for storage in the storage resource. This facilitates conversion of a document image consisting of a plurality of pages to an electronic document including a table of contents and an index. Also, an appropriate portion of an electronic document can be displayed by simply specifying a desired page number contained in a table of contents or index, which can provide user-friendly electronic documents.

It should be noted that the present invention is not limited to the configuration of the above-described embodiment, but any configuration capable of achieving the functions shown in the claims or the functions included in the configuration of the embodiment is applicable. For example, in the above-described embodiment, when generating a table of contents and an index, an electronic document header is generated if the condition that the current page is the first page is satisfied at page conversion process at step S5 for reasons such as necessity of page number management and improvement of processing efficiency by reducing transmission frequency by way of batch transmission. However, instead of such process at step S5, it is also possible to provide generation and transmission processes of an electronic document header prior to step S1.

Although the character recognition section 303 is provided in the above-described embodiment, the present invention can be realized without the character recognition section 303. In that case, the keyword extraction section 304 will be also unnecessary. Although an index cannot be created because keywords cannot be extracted, it is still possible to create a table of contents. That is, a table of contents can be created by storing partial images of title portions extracted, their position information, and page numbers, pasting the stored partial images onto the table of contents, and adding information on link to appropriate portions to page numbers at step S8 where table of contents data is generated.

In addition, in the above-described embodiment, the footer conversion section 307 adjusts the resolution of a partial image (or performs resolution conversion) when table of contents data and index data are generated from stored character portion images, character codes, and character position information at step S8 (see also step S25) as mentioned above. However, some partial images can have an extremely high image resolution when the document image 301 is of high definition or the data size of a stored partial image can be large when the document image 301 is not of a very high resolution but in full color.

When there is not sufficient capacity available for storing such partial images, the page data conversion section 305 may evaluate at step S5 the recognition result as at step S23, and may adjust the resolution of a partial image to be stored only when the reliability of the recognition result is below a predetermined threshold. In this case, efficiency of page conversion process would be somewhat decreased. Further, it is also possible to reduce the amount of data at step S5 by binarization process when the image is a multivalued image such as a full-color image. To address this, when determining whether to use partial images for creation of items of a table of contents, the footer conversion section 307 may operate as follows: In a modification of the flowchart of FIG. 11 in which step S23 is eliminated and step S24 is changed to a process of determining whether a stored recognition result accompanies any partial image, when there is a partial image, process at step S25 is performed, and when there is no partial image, process at step S26 is performed.

The present invention may either be applied to a system composed of a plurality of apparatuses or to a single apparatus. Although the description of the above-described embodiment referred to application to an MFP, however, the invention is applicable to various types of apparatuses such as information processing apparatuses capable of inputting document image data and scanner apparatuses that have the above-described document conversion function.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above-described embodiment, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

This application claims the benefit of Japanese Application No. 2005-174112, filed Jun. 14, 2005, which is hereby incorporated by reference herein in its entirety.

What is claimed is:

1. A document conversion apparatus for converting document image data to an electronic document, said document conversion apparatus comprising:
   a memory that stores program instructions to perform a document conversion function; and
   a processor that executes the program instructions stored in the memory to perform the document conversion function;
   wherein the processor executes the program instructions as functional sections, the functional sections including: a character region extraction section that extracts character regions from the document image data, a table of contents data generation section that generates table of contents data based on the extracted character regions and page numbers of the character regions, an electronic document generation section that generates the electronic document having a table of contents based on the document image data and the generated table of contents data, a character recognition section that performs character recognition on the extracted character regions, a keyword extraction section that extracts keywords from a result of the character recognition, and an index data generation section that generates index data based on the extracted keywords and page numbers thereof,
   wherein said table of contents data generation section comprises a table of contents link information adding section that adds link information to respective ones of items in the generated table of contents data for linking the items in the generated table of contents data with corresponding positions in the electronic document in which the items are described,
   wherein said index data generation section comprises an index link information adding section that adds links information to respective ones of items in the index data for linking the items in the generated index data with corresponding positions in the electronic document in which these items are described, and
   wherein said electronic document generation section generates the electronic document having the table of contents and an index based on the document image data, the table of contents data, and the index data.

2. The document conversion apparatus according to claim 1, wherein the functional sections further comprise a title portion determination section that determines a title portion from the extracted character regions, and
   wherein said table of contents data generation section generates the table of contents data based on a character region for the title portion and a page number of the character region.

3. The document conversion apparatus according to claim 1,
   wherein said table of contents data generation section generates the table of contents data based on the character regions, a result of the character recognition on the character regions, and page numbers of the character regions.

4. The document conversion apparatus according to claim 1, wherein the functional section further comprise a data conversion section that converts the document image data to the electronic document corresponding to a predetermined document format,
   wherein said electronic document generation section generates the electronic document having the table of contents based on the electronic document of the predetermined document format that is converted by said data conversion section and the table of contents data that is generated by said table of contents data generation section.

5. The document conversion apparatus according to claim 1, wherein when any of the items in the table of contents data is specified by a user, a corresponding position in the generated electronic document in which the specified item is described is displayed.

6. The document conversion apparatus according to claim 1, wherein the functional sections further comprise:
   a reliability determination section that determines a reliability of a result of the character recognition, and
   wherein said table of contents data generation section generates the table of contents data in which partial character image data for a title portion is made displayable and character codes resulting from the character recognition on the title portion are made undisplayable when the reliability is below a threshold value, and generates the table of contents data in which fonts corresponding to the character codes are made displayable when the reliability is above the threshold value.

7. The document conversion apparatus according to claim 1, wherein the generated electronic document has a data structure that presents the table of contents, document pages, and the index in this order when the electronic document is opened by an application.

8. A document conversion method of converting document image data to an electronic document, said document conversion method comprising:
   a character region extraction step of extracting character regions from the document image data;
   a table of contents data generation step of generating table of contents data based on the extracted character regions and page numbers of the character regions;
   an electronic document generation step of generating the electronic document having a table of contents based on the document image data and the generated table of contents data;
   a character recognition step of performing character recognition of the extracted character regions;
   a keyword extraction step of extracting keywords from a result of the character recognition; and
   an index data generation step of generating index data based on the extracted keywords and page numbers thereof, wherein said table of contents data generation step comprises a table of contents link information adding step of adding link information to respective ones of items in the generated table of contents data for linking the items in the generated table of contents data with corresponding positions in the electronic document in which the items are described, wherein said index data generation step comprises an index link information adding step that adds link information to respective ones of items in the index data for linking the items in the generated index data with corresponding positions in the electronic document in which these items are described, and wherein said electronic document generation step generates the electronic document having the table of contents and an index based on the document image data, the table of contents data, and the index data.

9. A document conversion system having a document processing apparatus and an information processing apparatus are interconnected via a network, wherein said document processing apparatus comprises:

a data conversion device that converts document image data to document data corresponding to a predetermined document format;

a character region extraction device that extracts character regions from the document image data;

a document data transmission device that transmits the converted document data to said information processing apparatus whenever the document image data for a predetermined number of pages is converted by said data conversion device;

a table of contents data generation device that generates table of contents data based on the extracted character regions and page numbers of the character regions; and a table of content data transmission device that transmits the generated table of content data to said information processing apparatus, wherein said information processing apparatus comprises:

a reception device that receives the document data and the table of contents data; and an electronic document generation device that generates an electronic document corresponding to the predetermined document format by combining the received document data with the received table of contents data, and wherein said document processing apparatus further comprises:

a character recognition device that performs character recognition on the extracted character regions;

a keyword extraction device that extracts keywords from a result of the character recognition;

an index data generation device that generates index data based on the extracted keywords and page numbers thereof; and an index data transmission device that transmits the generated index data to said information processing apparatus, wherein said reception device receives the document image data, the table of contents data, and the index data, and said electronic document generation device generates the electronic document by combining the received document image data with the received table of contents data and the received index data.

10. A document conversion apparatus for converting document image data to an electronic document, said document conversion apparatus comprising a processor which functions as:

a character region extraction section that extracts character regions from the document image data;

a character recognition section that performs character recognition on the extracted character regions;

a keyword extraction section that extracts keywords from a result of the character recognition;

a table of contents data generation section that generates a table of contents data based on the extracted character regions and page numbers of the character regions, and adds link information to respective ones of items of the generated table of contents data for linking the items of the generated table of contents data with corresponding portions in the electronic document; and an index data generation section that generates index data based on the extracted keywords and page numbers thereof, and adds link information to respective ones of items in the index data for linking the items in the generated index data with corresponding portions in the electronic document in which these items are described, and wherein the electronic document having table of contents and an index is obtained by combining the document image data, the table of contents data, and the index data.

11. A document conversion system having a document processing apparatus and an information processing apparatus are interconnected via a network, wherein said document processing apparatus comprises a processor which functions as:

a character region extraction section that extracts character regions from document image data;

a character recognition section that performs character recognition on the extracted character regions;

a keyword extraction section that extracts keywords from a result of the character recognition;

a table of content data generation section that generates a table of contents data based on the extracted character regions and page numbers of the character regions, and adds link information to respective ones of items of the generated table of contents data for linking the items of the generated table of contents data with corresponding portions in an electronic document;

a table of contents transmission section that transmits the generated table of content data to said information processing apparatus;

an index data generation section that generates index data based on the extracted keywords and page numbers thereof; and an index data transmission section that transmits the generated index data to said information processing apparatus, wherein said information processing apparatus comprises a processor which functions as:

a reception section that receives the document image data, the table of contents data, and the index data; and an electronic document generation section that generates the electronic document by combining the received document image data with the received table of contents data and the received index data.

* * * * *